US009399996B2

(12) United States Patent
 Watkins

(10) Patent No.: US 9,399,996 B2
(45) Date of Patent: Jul. 26, 2016

(54) CAM PLATE AND AN APPLIANCE INCLUDING THE CAM PLATE

(75) Inventor: Derek Lee Watkins, Elizabethtown, KY (US)

(73) Assignee: General Electric Company, Schenectady, NY (US)

( * ) Notice: Subject to any disclaimer, the term of this patent is extended or adjusted under 35 U.S.C. 154(b) by 1048 days.

(21) Appl. No.: 13/186,767

(22) Filed: Jul. 20, 2011

(65) Prior Publication Data

US 2013/0022478 A1    Jan. 24, 2013

(51) Int. Cl.
| | |
|---|---|
| *F04B 23/14* | (2006.01) |
| *F16H 53/06* | (2006.01) |
| *F04D 15/00* | (2006.01) |
| *F16D 41/10* | (2006.01) |
| *F16D 41/066* | (2006.01) |

(52) U.S. Cl.
CPC ........ *F04D 15/0066* (2013.01); *F04D 15/0077* (2013.01); *F16D 41/105* (2013.01); *F16D 2041/0665* (2013.01); *F16D 2300/12* (2013.01); *Y10T 74/2107* (2015.01)

(58) Field of Classification Search
CPC . F04D 13/022; F04D 15/006; F04D 15/0077; F16D 2041/0665; F16D 2300/12; F16D 41/105; Y10T 74/2107
USPC .............. 417/212, 221, 223, 423.1, 319, 316; 415/122.1, 123, 124.1; 416/169 R, 416/169 A, 170 R; 192/48.92
See application file for complete search history.

(56) References Cited

U.S. PATENT DOCUMENTS

| | | | |
|---|---|---|---|
| 4,989,705 A | 2/1991 | Kashio et al. | |
| 5,595,272 A | 1/1997 | Zhou | |
| 6,050,512 A | 4/2000 | Jung | |
| 6,384,508 B1 * | 5/2002 | Marioni | 310/261.1 |
| 6,524,078 B1 * | 2/2003 | Brooks et al. | 417/223 |
| 6,988,873 B2 | 1/2006 | Marioni | |
| 2004/0179942 A1 * | 9/2004 | Newman et al. | 416/170 R |
| 2005/0023911 A1 * | 2/2005 | Marioni | 310/75 R |
| 2008/0080987 A1 * | 4/2008 | Zhang et al. | 417/319 |
| 2013/0022467 A1 * | 1/2013 | Watkins | 416/169 R |

FOREIGN PATENT DOCUMENTS

EP    2 042 074 A1    4/2009

OTHER PUBLICATIONS

Derek Lee Watkins, Jul. 20, 2011, U.S. Appl. 13/186,749.
Non-Final Rejection towards U.S. Appl. No. 13/186,749 dated Feb. 12, 2014.
Final Rejection towards U.S. Appl. No. 13/186,749 dated Sep. 24, 2014.

* cited by examiner

*Primary Examiner* — Peter J Bertheaud
*Assistant Examiner* — Dominick L Plakkoottam
(74) *Attorney, Agent, or Firm* — Dority & Manning, P.A.

(57) ABSTRACT

A cam plate for use with a pump includes at least one camming surface configured to enable an impeller to rotate in a first direction and substantially prevent the impeller from rotating in a second direction opposite the first direction. A ring recess is defined in the cam plate. The ring recess is configured to receive at least a portion of a cam ring that is configured to rotate within the ring recess. A follower recess is at least partially defined by the at least one camming surface and extends from the ring recess. The follower recess is configured to receive at least one cam follower therein.

18 Claims, 12 Drawing Sheets

CAM PLATE AND AN APPLIANCE INCLUDING THE CAM PLATE

BACKGROUND OF THE INVENTION

The embodiments described herein relate generally to rotor assemblies and, more particularly, to a rotor assembly that is biased to rotate in one direction.

At least some known pumps are synchronous pumps that include a permanent magnet therein. Such pumps typically do not have a preset direction of spin, and can rotate either clockwise or counter-clockwise when the pump is started. More specifically, alternating current (AC) is used to power the pump, and a rotor assembly includes a substantially cylindrical magnet having a first half with a north polarity and a second half with a south polarity. Since the power driving the pump is based on alternating current, the magnetic field supplied by the stator assembly is constantly changing polarity. When the AC power is applied to the stator winding, the stator assembly develops a magnetic field. If the stator winding's poles align with the rotor magnet's poles, the rotor assembly will rotate as the "like" paired poles push against each other, or repel each other. If the stator winding's poles are out of phase with the rotor magnet's poles, the rotor assembly will rotate to a state where the oppositely paired poles align, or attract each other. Further, if poles of the rotor assembly align adjacent to an opposite pole of the stator assembly, the rotor assembly may not begin rotating because the poles attract each other. Such a position of rotor assembly is referred to as a null position.

Because the first alignment of the poles of the rotor magnet and stator winding is random, the direction of impeller rotation is also random. Inertia of the rotor assembly maintains rotation of the impeller in one direction once the rotor assembly begins rotating. Such synchronous pumps are relatively inexpensive. However, because of the equal probability of spin direction, impeller efficiency must be sacrificed to provide equal flow rates in either spin direction. More specifically, such pumps usually include impellers having straight blades that are equally efficient in either spin direction.

Known induction pumps are more expensive than permanent magnet synchronous pumps, but have higher efficiency than synchronous pumps. More specifically, at least some known induction pumps only allow rotation of an impeller in one direction. As such, induction pumps include contoured or curved blades that are more efficient in one rotation direction than the other rotation direction. However, such contoured or curved blades cannot be used with known synchronous pumps because of the random rotation direction of the impeller. Accordingly, permanent magnet synchronous pumps can not typically match the performance of an induction pump, given the same power rating.

BRIEF DESCRIPTION OF THE INVENTION

In one aspect, a cam plate for use with a pump is provided. The cam plate includes at least one camming surface configured to enable an impeller to rotate in a first direction and substantially prevent the impeller from rotating in a second direction opposite the first direction. A ring recess is defined in the cam plate. The ring recess is configured to receive at least a portion of a cam ring that is configured to rotate within the ring recess. A follower recess is at least partially defined by the at least one camming surface and extends from the ring recess. The follower recess is configured to receive at least one cam follower therein.

In another aspect, an appliance is provided. The appliance includes a pump having an impeller and a cam plate. The cam plate includes at least one camming surface configured to enable the impeller to rotate in a first direction and substantially prevent the impeller from rotating in a second direction opposite the first direction. A ring recess is defined in the cam plate. The ring recess is configured to receive at least a portion of a cam ring that is configured to rotate within the ring recess. A follower recess is at least partially defined by the at least one camming surface and extends from the ring recess. The follower recess is configured to receive at least one cam follower therein.

BRIEF DESCRIPTION OF THE DRAWINGS

FIG. 1 is a schematic side view of an exemplary pump.

FIG. 2 is a side view of an exemplary rotor assembly that may be used with the pump shown in FIG. 1.

FIG. 3 is an exploded top perspective view of the rotor assembly shown in FIG. 2.

FIG. 4 is a bottom perspective view of an exemplary impeller that may be used with the rotor assembly shown in FIGS. 2 and 3.

FIG. 5 is a top cross-sectional view of the rotor assembly shown in FIGS. 2-4 taken at line 2 in FIG. 2 in a first position.

FIG. 6 is a top cross-sectional view of the rotor assembly shown in FIGS. 2-4 taken at line 2 in FIG. 2 in a second position.

FIG. 7 is a side view of a first alternative rotor assembly that may be used with the pump shown in FIG. 1.

FIG. 8 is an exploded top perspective view of the rotor assembly shown in FIG. 7.

FIG. 9 is a bottom view of an exemplary impeller that may be used with the rotor assembly shown in FIGS. 7 and 8.

FIG. 10 is a top cross-sectional view of the rotor assembly shown in FIGS. 7-9 taken at line 7 in FIG. 7 in a first position.

FIG. 11 is a top cross-sectional view of the rotor assembly shown in FIGS. 7-9 taken at line 7 in FIG. 7 in a second position.

FIG. 12 is an exploded top perspective view of a second alternative rotor assembly that may be used with the pump shown in FIG. 1.

FIG. 13 is a cross-sectional top view of the rotor assembly shown in FIG. 12.

FIG. 14 is a flowchart of an exemplary method for assembling, making, and/or otherwise manufacturing the pump shown in FIGS. 1-13.

DETAILED DESCRIPTION OF THE INVENTION

The embodiments described herein provide a synchronous pump that matches an induction pump's performance, but remains relatively inexpensive compared to an induction pump. More specifically, the herein-described pump includes a biasing mechanism that biases an impeller to rotate in one direction. As such, blades of the impeller can be contoured to provide higher efficiency when the impeller rotates in that direction. Accordingly, the pump described herein has higher efficiency than known synchronous pumps. Further, the embodiments described herein provide null position relief or compensation to prevent stalling of the pump.

Figure 1:
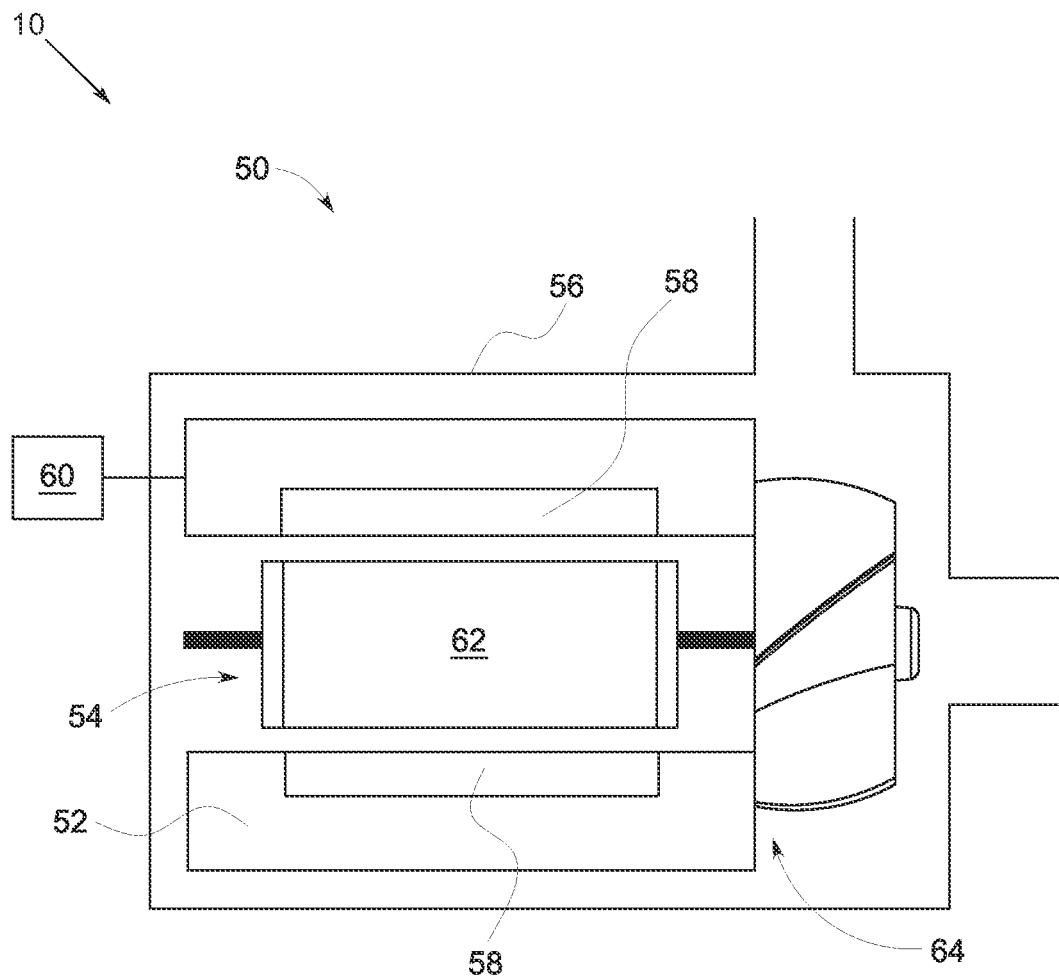
FIGS. 1-14 show exemplary embodiments of the apparatus and methods described herein.

FIG. 1 is a schematic side view of an exemplary pump 50 that is configured for use in any suitable pumping application. In a particular embodiment, pump 50 is used as a main fill pump in a dishwasher and/or other suitable appliance 10. In the exemplary embodiment, pump 50 is a synchronous pump that includes a stator assembly 52 and a rotor assembly 54 positioned within a housing 56. Stator assembly 52 includes at least one winding 58 having a pair of poles, also referred to herein as stack poles. The poles of stator winding 58 are determined by the alternating current (AC) power supplied to pump 50. In one embodiment, stator assembly 52 includes a plurality of stator windings 58. In the exemplary embodiment, winding 58 is coupled to a power supply 60 for receiving electrical power from power supply 60. More specifically, power supply 60 supplies the AC power to winding 58. Winding 58 is configured to generate a magnetic field when the electrical power is received from power supply 60.

Rotor assembly 54 is positioned proximate stator assembly 52 and includes at least one magnet 62 having a pair of poles. In one embodiment, rotor assembly 54 includes a series of magnets 62 such that rotor assembly 54 includes a plurality of pairs of poles positioned about a circumference of rotor assembly 54. In the exemplary embodiment, magnet 62 is a permanent magnet. Pump 50 further includes a biasing mechanism 64 configured to enable rotation of rotor assembly 54 in a first direction and to substantially prevent rotation of rotor assembly 54 is a second direction opposite the first direction. Biasing mechanism 64 includes a sealing system (not shown) to facilitate preventing debris from entering biasing mechanism 64.

During use, power supply 60 supplies electrical power to stator assembly 52, and winding 58 generates a magnetic field. Rotor assembly 54 is positioned within the magnetic field generated by stator winding 58. Interaction between rotor magnet 62 and the magnetic field generated by stator winding 58 causes rotor assembly 54 to rotate with respect to stator assembly 52. For example, like poles of stator winding 58 and rotor magnet 62 repel or attract each other to begin rotation of rotor assembly 54. If rotor assembly 54 rotates in the first direction, biasing mechanism 64 allows rotation of rotor assembly 54. If rotor assembly 54 rotates in the second direction, biasing mechanism 64 prevents rotation of rotor assembly 54 by stopping rotation of rotor assembly 54. When a sign of the AC power supplied to stator winding 58 changes, which changes the poles of stator winding 58, the stopped rotor assembly 54 begins rotating in the first direction. Rotation of rotor assembly 54 generates a pumping force as described in more detail herein.

Figure 2:
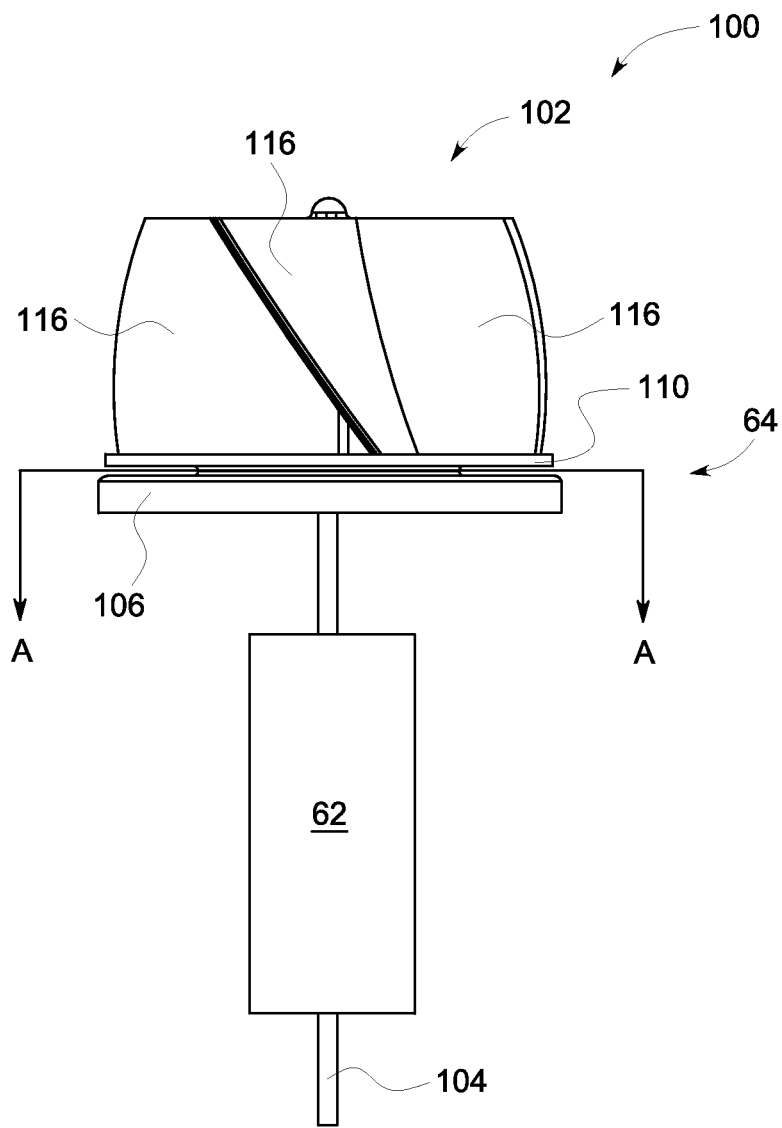
Figure 3:
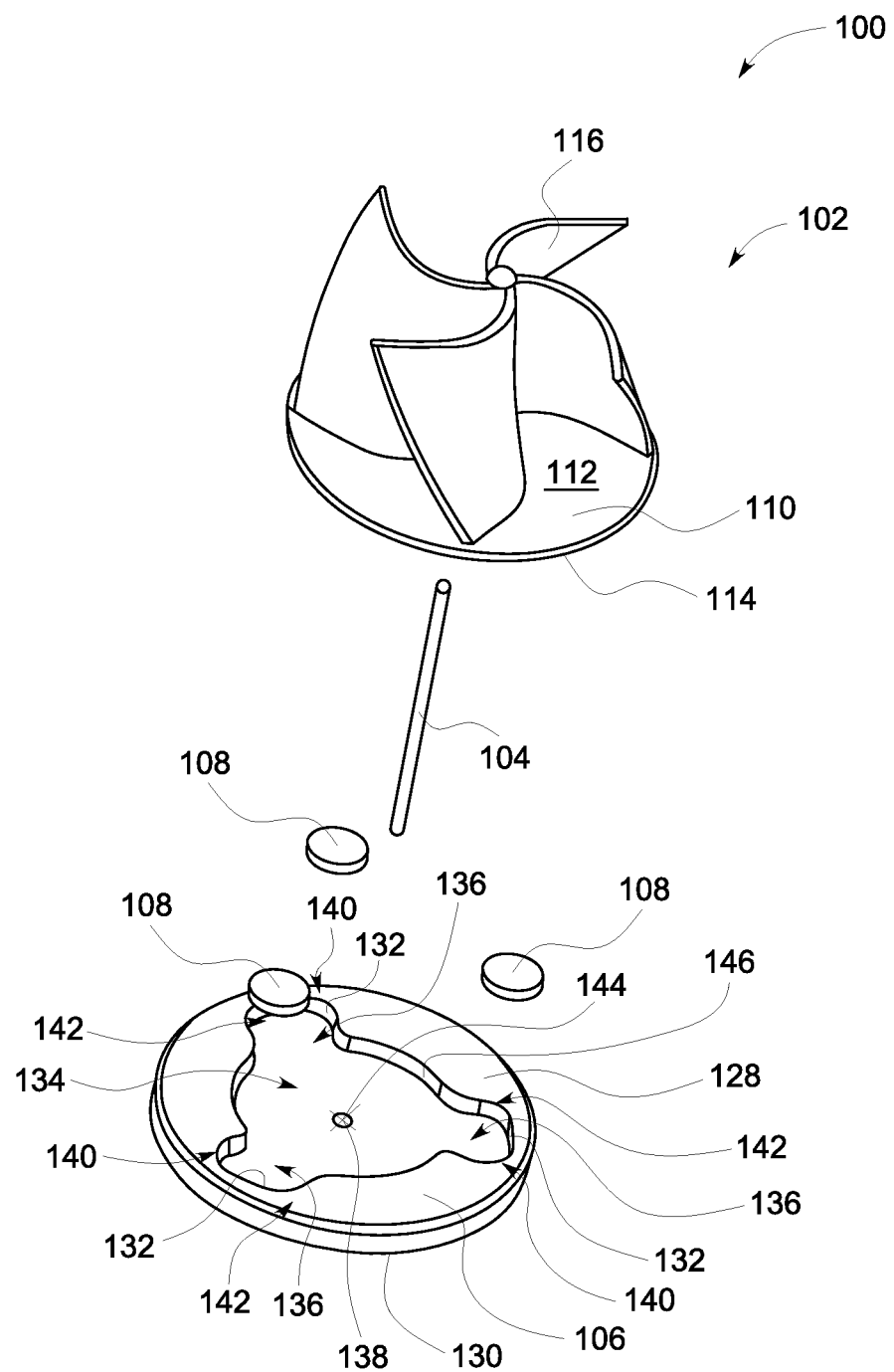
Figure 4:
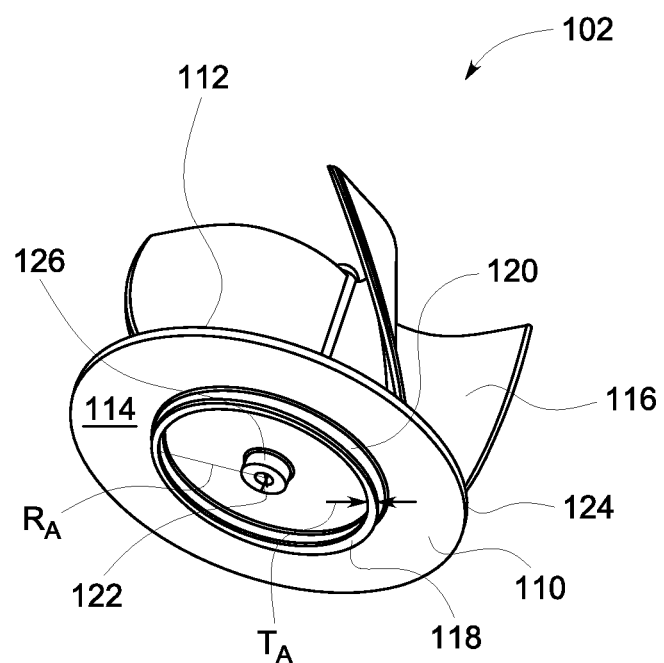

FIG. 2 is a side view of an exemplary rotor assembly 100 that may be used with pump 50 (shown in FIG. 1) as rotor assembly 54 (shown in FIG. 1). FIG. 3 is an exploded top perspective view of rotor assembly 100. FIG. 4 is a bottom perspective view of an exemplary impeller 102 that may be used with rotor assembly 100. Referring to FIGS. 1-4, rotor assembly 100 includes magnet 62, impeller 102, a shaft 104, a cam plate 106, and at least one cam follower 108. Biasing mechanism 64 includes at least a portion of impeller 102, cam plate 106, and cam follower 108.

In the exemplary embodiment, magnet 62 is coupled about shaft 104 and is positioned adjacent stator winding 58. More specifically, magnet 62 is fixedly coupled with respect to shaft 104 such that shaft 104 rotates with magnet 62. Shaft 104 extends through magnet 62 and cam plate 106 to impeller 102. More specifically, shaft 104 is directly or indirectly coupled to impeller 102 to rotate impeller 102 with respect to stator assembly 52. Further, shaft 104 rotates with respect to cam plate 106, as described in more detail herein.

Impeller 102 includes an impeller plate 110 having a first surface 112 and an opposing second surface 114 Impeller 102 further includes blades 116 extending from first surface 112 and a cam ring 118 extending from second surface 114 Impeller 102 has any suitable number of blades 116, including one blade 116, that enable(s) pump 50 to function as described herein. In the exemplary embodiment, each blade 116 has a curved or contoured shape that is configured to increase efficiency of pump 50 when impeller 102 rotates in the first direction, as compared to blades having a straight shape. Although curved blades 116 are described herein, it should be understood that blades 116 can have any suitable shape that enables pump 50 to function as described herein. In the exemplary embodiment, cam ring 118 is substantially circular and includes a wall 120 having a substantially constant thickness $T_A$. More specifically, cam ring 118 extends from impeller plate 110 at a radius $R_A$ between a center 122 of impeller plate 110 and a circumferential edge 124 of impeller plate 110. Cam ring 118, in one embodiment, is a component of biasing mechanism 64. In the exemplary embodiment, shaft 104 is coupled to impeller 102 at center 122 of impeller plate 110. As such, a collar 126 extends from second surface 114 of impeller plate 110 about center 122. Collar 126 is configured to receive at least a portion of shaft 104.

Cam plate 106 has a first surface 128 and an opposing second surface 130. Cam plate 106 includes at least one camming surface 132, a ring recess 134, and a follower recess 136. Cam plate 106 further includes a center aperture 138 configured to receive shaft 104 therethrough. In the exemplary embodiment, cam plate 106 is stationary with respect to the remainder of rotor assembly 100 and is configured to cooperate and/or interact with cam ring 118, as described in more detail below. As used herein, the terms "to cooperate with" and/or "to interact with" refer to two or more components that act with each other or jointly to achieve a common outcome. The two or more components can engage each other, directly or indirectly contact each other, and/or otherwise operate jointly to achieve the outcome, such as enabling an impeller to rotate in one direction but not in another direction. In one embodiment, cam plate 106 is coupled to stator assembly 52 and/or housing 56 such that cam plate 106 is substantially stationary with respect to shaft 104 and impeller 102. Alternatively, cam plate 106 is coupled to any suitable component that enables pump 50 to function as described herein. In the exemplary embodiment, cam plate 106 is described as having substantially the same diameter as impeller plate 110, however, it should be understood that cam plate 106 can have any suitable diameter.

Camming surface 132 is configured to force cam follower 108 against cam ring 118 when impeller 102 rotates in the second direction. More specifically, camming surface 132 is defined in first surface 128 of cam plate 106 to at least partially define a respective follower recess 136. In the exemplary embodiment, cam plate 106 includes a plurality of camming surfaces 132, such as three camming surfaces 132, circumferentially aligned about cam plate 106. Each camming surface 132 is substantially similar and includes a first end region 140 and a second end region 142. First end region 140 has a first depth $D_{A1}$ (shown in FIG. 5), and second end region 142 has a second depth $D_{A2}$ (shown in FIG. 5). Each depth $D_{A1}$ and $D_{A2}$ is defined along a radius of cam plate 106 beginning at a circumference of ring recess 134. In the exemplary embodiment, second depth $D_{A2}$ is less than first depth $D_{A1}$. Alternatively, camming surface 132 has any suitable configuration that enables pump 50 to function as described herein. In the exemplary embodiment, each follower recess 136 has a shape corresponding to a respective camming surface 132.

Follower recesses 136 extend outwardly from ring recess 134. More specifically, ring recess 134 is defined about a center 144 of cam plate 106 as one continuous indentation in first surface 128 configured to receive cam ring 118. Alternatively, ring recess 134 is defined as an annular channel in cam plate 106 such that ring recess 134 is configured to receive cam ring 118. In the exemplary embodiment, follower recesses 136 are continuous with ring recess 134, and follower recesses 136 and ring recess 134 are defined by one continuous indentation in first surface 128. As such, camming surfaces 132 form a portion of a wall 146 defining the indentation. In an alternative embodiment, camming surfaces 132, follower recesses 136, and/or ring recess 134 are defined by walls extending upwardly from first surface 128 of cam plate 106.

Rotor assembly 100 further includes at least one cam follower 108 configured to be positioned between cam ring 118 and camming surface 132 when rotor assembly 100 is assembled. In the exemplary embodiment, rotor assembly 100 includes a cam follower 108 for each camming surface 132. As such, when cam plate 106 includes three camming surfaces 132, rotor assembly 100 includes three cam followers 108. Each cam follower 108 is positioned within one follower recess 136 adjacent a respective camming surface 132. Each cam follower 108 is configured to cooperate and/or interact with a respective camming surface 132 and/or cam ring 118 to enable rotation of impeller 102 in the first direction and substantially prevent rotation of impeller 102 in the second direction. In the exemplary embodiment, each cam follower 108 is a weighted disk, however, it should be understood that cam follower 108 can have any suitable configuration that enables pump 50 to function as described herein.

Figure 5:
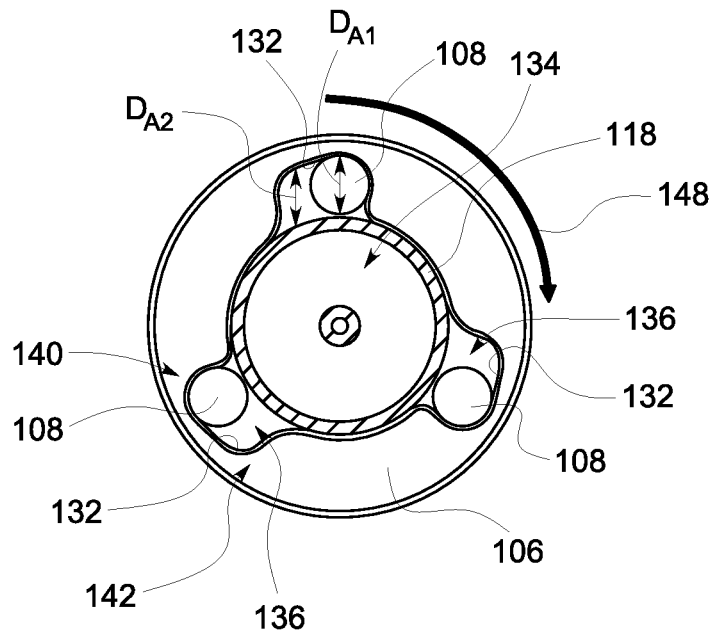
Figure 6:
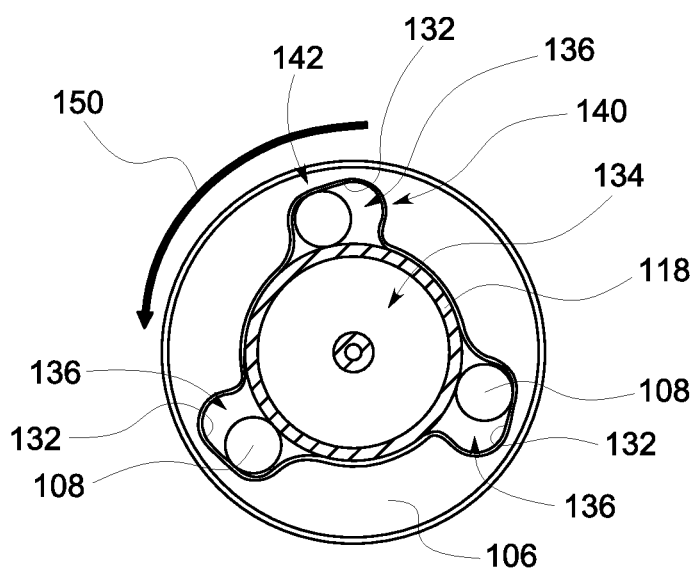

FIG. 5 is a top cross-sectional view of rotor assembly 100 taken at line 2 in FIG. 2 in a first position when impeller 102 rotates in a first direction 148. FIG. 6 is a top cross-sectional view of rotor assembly 100 taken at line 2 in FIG. 2 in a second position when impeller 102 rotates in a second direction 150 opposite first direction 148. First direction 148 can be clockwise or counter-clockwise, although first direction 148 is shown as being clockwise in FIG. 5. Similarly, second direction 150 can be clockwise or counter-clockwise, although second direction 150 is shown as being counter-clockwise in FIG. 6. Referring to FIG. 5, when rotor assembly 100 rotates in first direction 148, cam ring 118 moves cam follower 108 toward first end region 140 of camming surface 132. Because camming surface 132 is deeper at first end region 140, cam follower 108 is in spaced relation with cam ring 118 and/or camming surface 132 when impeller 102 rotates in first direction 148. Such a state is also referred to as a free state. In the free state, any force between cam follower 108 and cam ring 118 and/or between cam follower 108 and camming surface 132 is released. Hydraulic drag created by cam ring 118 rotating in first direction 148 maintains cam follower 108 in the free state.

Referring to FIG. 6, when rotor assembly 100 rotates in second direction 150, cam ring 118 moves cam follower 108 toward second end region 142 of camming surface 132. Because camming surface 132 is shallower at second end region 142, cam follower 108 is moved into contact with cam ring 118 and camming surface 132 when impeller 102 rotates in second direction 150. Such a state is also referred to as a locked state. In the locked state, forces between cam follower 108 and cam ring 118 and between cam follower 108 and camming surface 132 are applied. When the forces are applied to cam follower 108, rotation of impeller 102 is effectively stopped. While impeller 102 is stopped, the electrical power supplied to stator winding 58 (shown in FIG. 1) alternates, which alternates the poles of the magnetic field generated by stator winding 58. When the magnetic field reverses direction, stopped impeller 102 begins rotating in first direction 148 (shown in FIG. 5) and moves cam follower 108 to the free state.

Referring to FIG. 1, if opposite poles of rotor magnet 62 and stator winding 58 align, or attract each other, when pump 50 is turned off, rotor assembly 54 may not rotate when the electrical power is applied to stator winding 58. Such an orientation of poles is known as a null position. In the null position the magnetic fields of rotor assembly 54 and stator assembly 52 are in synchronism or out of synchronism, depending on the rotor orientation, which prevents rotor assembly 54 from developing a starting torque. Due to the inertia of rotor assembly 54 when pump 50 is turned off and the decaying magnetic fields of stator assembly 52, it is improbable this condition will occur during normal use. However, if an obstruction prevents an impeller of rotor assembly 54 from turning within housing 56, a probability exists that this condition may occur. A first alternative rotor assembly 200 (shown in FIGS. 7-11) and a second alternative rotor assembly 300 (shown in FIGS. 12 and 13) facilitate preventing rotor assembly 200 and/or 300 from locking in a null position.

Figure 7:
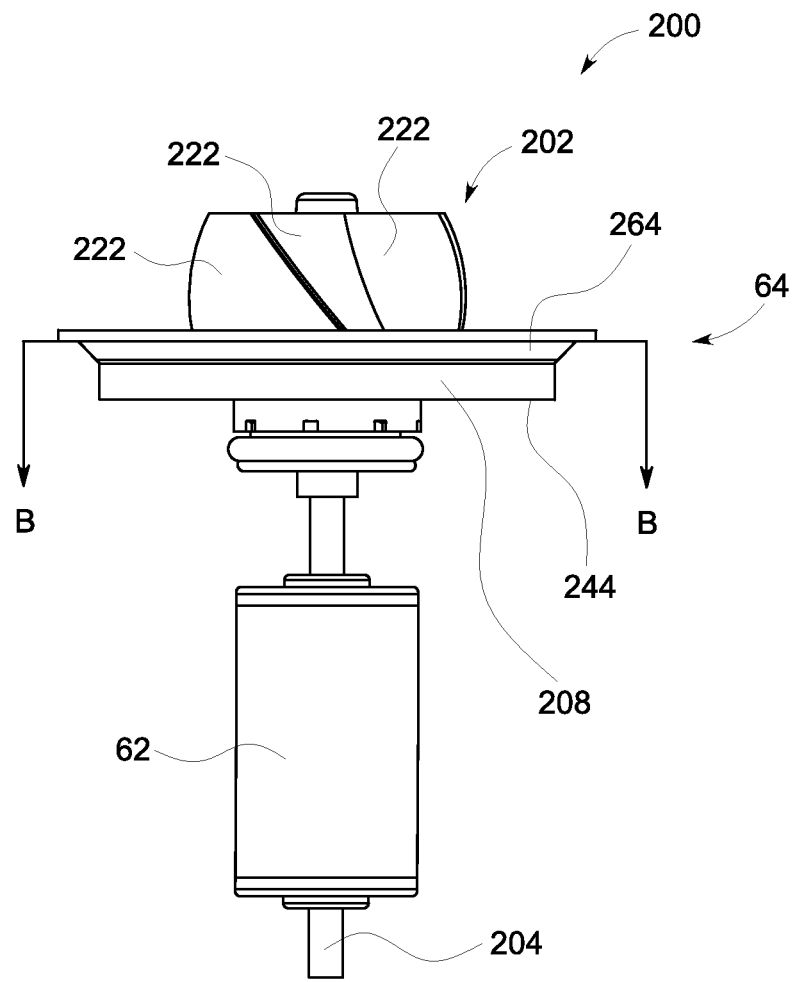
Figure 8:
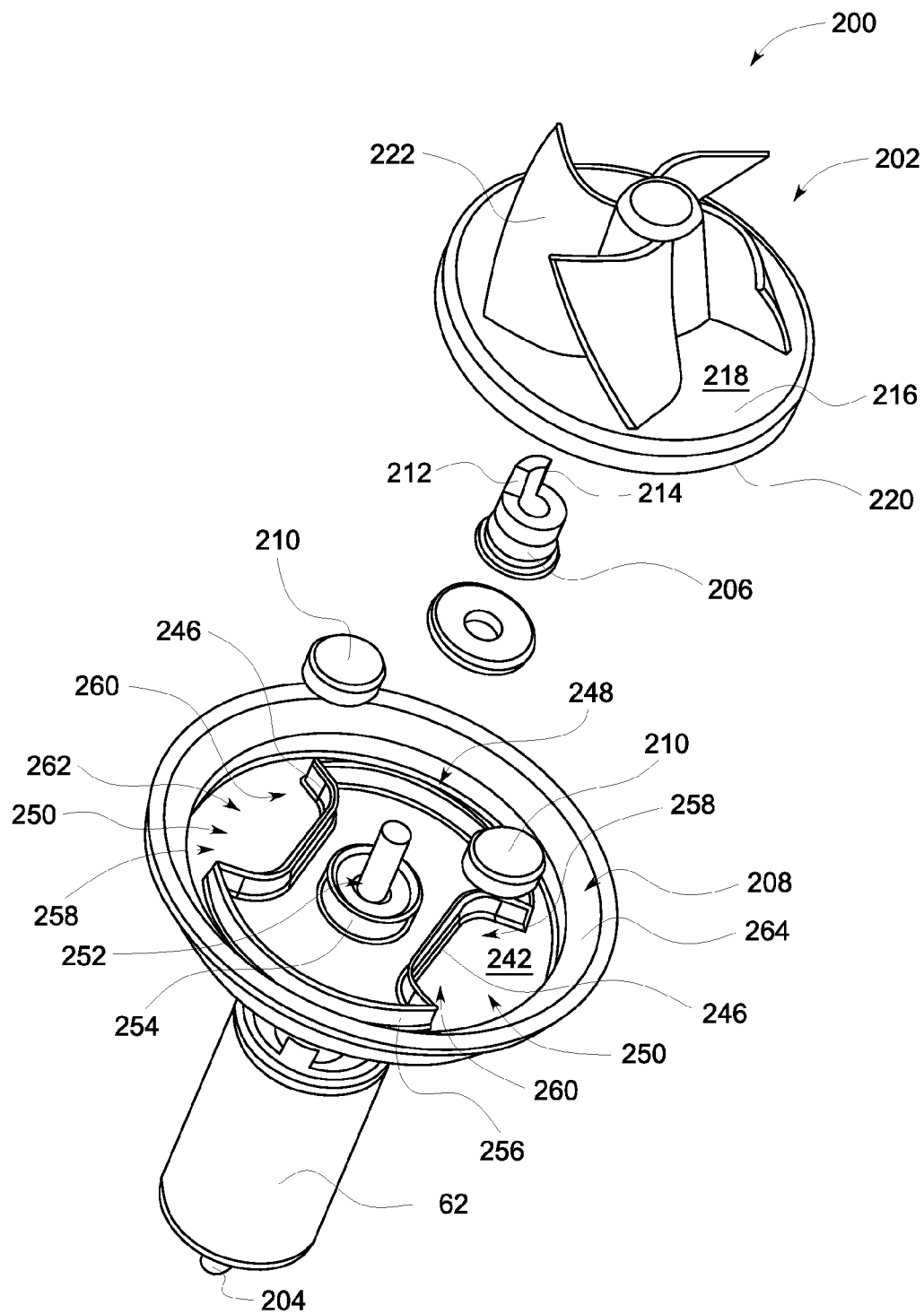
Figure 9:
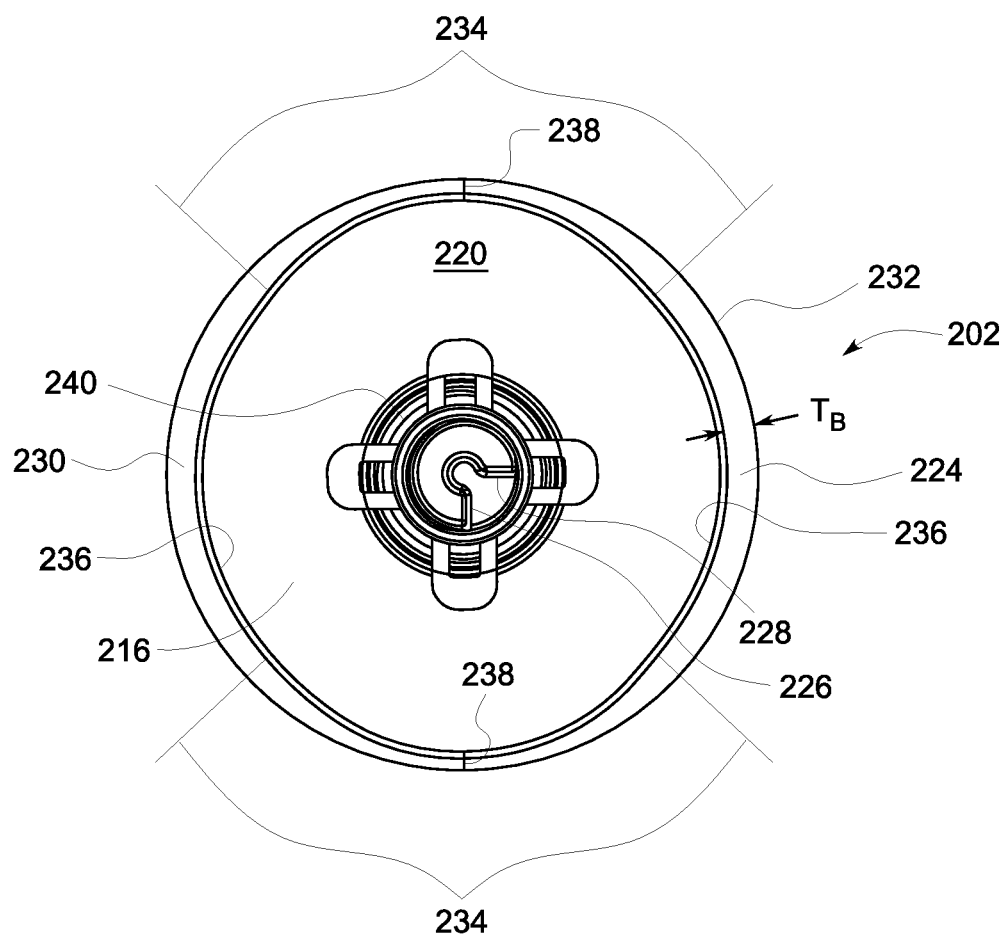

FIG. 7 is a side view of first alternative rotor assembly 200 that may be used with pump 50 (shown in FIG. 1) as rotor assembly 54 (shown in FIG. 1). FIG. 8 is an exploded top perspective view of rotor assembly 200. FIG. 9 is a bottom view of an exemplary impeller 202 that may be used with rotor assembly 200. Referring to FIGS. 1 and 7-9, rotor assembly 200 includes magnet 62, impeller 202, a shaft 204, a driver 206, a cam plate 208, and at least one cam follower 210. Biasing mechanism 64 includes driver 206, at least a portion of impeller 202, cam plate 208, and cam follower 210.

In the exemplary embodiment, magnet 62 is coupled about shaft 204 and is positioned adjacent stator winding 58. More specifically, magnet 62 is fixedly coupled with respect to shaft 204 such that shaft 204 rotates with magnet 62. Shaft 204 extends through magnet 62 and cam plate 208 to impeller 202. More specifically, shaft 204 is indirectly coupled to impeller 202 using driver 206. Shaft 204 rotates driver 206, which rotates impeller 202 with respect to stator assembly 52. Further, shaft 204 rotates with respect to cam plate 208, as described in more detail herein. Driver 206 includes a first driving surface 212 and a second driving surface 214. In the exemplary embodiment, driving surfaces 212 and 214 are aligned with null positions of rotor magnet 62 when driver 206 is coupled to shaft 204. For example, driving surfaces 212 and 214 are aligned with a 0° position and an 180° position when driver 206 is coupled to shaft 204.

Impeller 202 includes an impeller plate 216 having a first surface 218 and an opposing second surface 220 Impeller 202 further includes blades 222 extending from first surface 218 and a cam ring 224 extending from second surface 220. Cam ring 224, in one embodiment, is a component of biasing mechanism 64. A first driven surface 226 and a second driven surface 228 are defined by cam plate 208. Impeller 202 has any suitable number of blades 222, including one blade 222, that enable(s) pump 50 to function as described herein. In the exemplary embodiment, each blade 222 has a curved or contoured shape that is configured to increase efficiency of pump 50 when impeller 202 rotates in the first direction, as compared to blades having a straight shape. Although curved blades 222 are described herein, it should be understood that blades 222 can have any suitable shape that enables pump 50 to function as described herein.

In the exemplary embodiment, cam ring 224 is generally circular and includes a wall 230 having a varied thickness $T_B$ along a circumference thereof. More specifically, cam ring 224 extends from impeller plate 216 at a circumferential edge 232 of impeller plate 216. Wall 230 defines at least one follower relief 234 and at least one locking surface 236. More specifically, in the exemplary embodiment, wall 230 defines two opposing follower reliefs 234 and two opposing locking surfaces 236. As such, wall 230 alternately defines follower reliefs 234 and locking surfaces 236. At each locking surface 236, thickness $T_B$ is substantially constant. At each follower relief 234, thickness $T_B$ decreases from an adjacent locking surface 236 toward a center 238 of follower relief 234. Alternatively, wall 230 has any suitable configuration that substantially prevents impeller 202 from being oriented in a null position.

In the exemplary embodiment, first driven surface 226 is configured to be adjacent to, or in direct contact with, first driving surface 212 and second driven surface 228 is configured to be adjacent to, or in direct contact with, second driving surface 214 when impeller 202 is coupled to driver 206. Because driving surfaces 212 and 214 are aligned with the poles of rotor magnet 62, driven surfaces 226 and 228 are also aligned with the poles of rotor magnet 62. By preventing driven surfaces 226 and 228 from aligning with the poles of stator winding 58, the poles of rotor magnet 62 are substantially prevented from aligning with the poles of stator winding 58. More specifically, an alignment of cam plate 208 facilitates preventing driven surfaces 226 and 228 from aligning with the poles of stator winding 58, as described in more detail below Impeller plate 216 further includes a support ring 240 extending from second surface 220 about driven surfaces 226 and 228. Support ring 240 is configured to support impeller 202 on cam plate 208.

Cam plate 208 has a first surface 242 and an opposing second surface 244. Cam plate 208 includes at least one camming surface 246, a ring recess 248, and a follower recess 250. Cam plate 208 further includes a center aperture 252 and a collar 254 configured to receive shaft 204 therethrough. Collar 254 is configured to be received within support ring 240. In the exemplary embodiment, cam plate 208 is stationary with respect to the remainder of rotor assembly 200 and is configured to cooperate and/or interact with cam ring 224, as described in more detail below. In one embodiment, cam plate 208 is coupled to stator assembly 52 and/or housing 56 such that cam plate 208 is substantially stationary with respect to shaft 204 and impeller 202. Alternatively, cam plate 208 is coupled to any suitable component that enables pump 50 to function as described herein. In the exemplary embodiment, cam plate 208 is described as having a diameter larger than a diameter of impeller plate 216, however, it should be understood that cam plate 208 can have any suitable diameter.

Camming surface 246 is configured to force cam follower 210 against cam ring 224 when impeller 202 rotates in the second direction. More specifically, camming surface 246 is defined by a wall 256 extending from first surface 242 of cam plate 208 to at least partially define a respective follower recess 250. In the exemplary embodiment, cam plate 208 includes a plurality of camming surfaces 246, such as two camming surfaces 246, diametrically opposed with respect to cam plate 208. Each camming surface 246 is substantially similar and includes a first end region 258 and a second end region 260. First end region 258 has a first depth $D_{B1}$ (shown in FIG. 10), and second end region 260 has a second depth $D_{B2}$ (shown in FIG. 10). Each depth $D_{B1}$ and $D_{B2}$ is defined along a radius of cam plate 208 beginning at an inner circumference of ring recess 248 and extending inward toward center aperture 252. In the exemplary embodiment, second depth $D_{B2}$ is less than first depth $D_{B1}$. Alternatively, camming surface 246 has any suitable configuration that enables pump 50 to function as described herein. In the exemplary embodiment, each follower recess 250 has a shape corresponding to a respective camming surface 246.

Follower recesses 250 extend inwardly from ring recess 248. More specifically, ring recess 248 is defined about an outer portion 262 of cam plate 208 as a channel at least partially defined by wall 256 and configured to receive cam ring 224. Follower recesses 250 are continuous with ring recess 248 and are also defined by wall 256. In an alternative embodiment, camming surfaces 246, follower recesses 250, and/or ring recess 248 are defined by at least one indentation defined in first surface 242 of cam plate 208. In the exemplary embodiment, camming surfaces 246 are aligned with null positions of stator winding 58 when cam plate 208 is coupled to stator assembly 52 and/or housing 56. More specifically, cam plate 208 is oriented such that cam plate 208 is keyed with the poles of stator winding 58. As such, the poles of stator winding 58 are aligned with camming surfaces 246 of cam plate 208. When cam plate 208 is keyed with respect to the poles of stator winding 58, positions of camming surfaces 246 are fixed with respect to the poles of stator winding 58. When driven surfaces 226 and 228 are aligned with driving surfaces 212 and 214, which are fixed with respect to the poles of rotor magnet 62, the positions of camming surfaces 246 substantially prevent the poles of rotor magnet 62 from aligning with the poles of stator winding 58.

Cam plate 208 further includes a lip 264 extending upward from first surface 242 and circumscribing ring recess 248. Lip 264 is configured to at least partially receive impeller plate 216 therein. As such, the diameter of cam plate 208, including lip 264, is larger than the diameter of impeller plate 216. Alternatively, cam plate 208 does not include lip 264.

Rotor assembly 200 further comprises at least one cam follower 210 configured to be positioned between cam ring 224 and camming surface 246 when rotor assembly 200 is assembled. In the exemplary embodiment, rotor assembly 200 includes a cam follower 210 for each camming surface 246. As such, when cam plate 208 includes two camming surfaces 246, rotor assembly 200 includes two cam followers 210. Each cam follower 210 is positioned within one follower recess 250 adjacent a respective camming surface 246. Each cam follower 210 is configured to cooperate and/or interact with a respective camming surface 246 and/or cam ring 224 to enable rotation of impeller 202 in the first direction and substantially prevent rotation of impeller 202 in the second direction. In the exemplary embodiment, each cam follower 210 is a weighted disk, however, it should be understood that cam follower 210 can have any suitable configuration that enables pump 50 to function as described herein.

Figure 10:
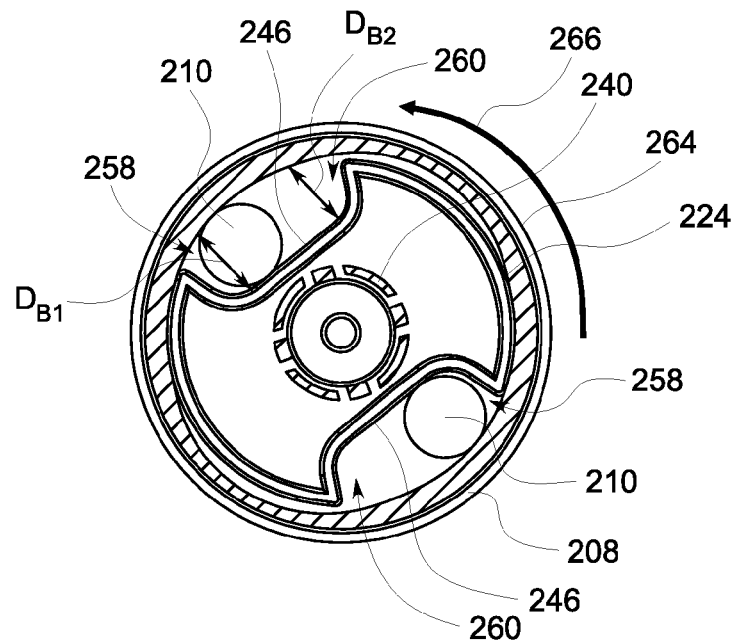
Figure 11:
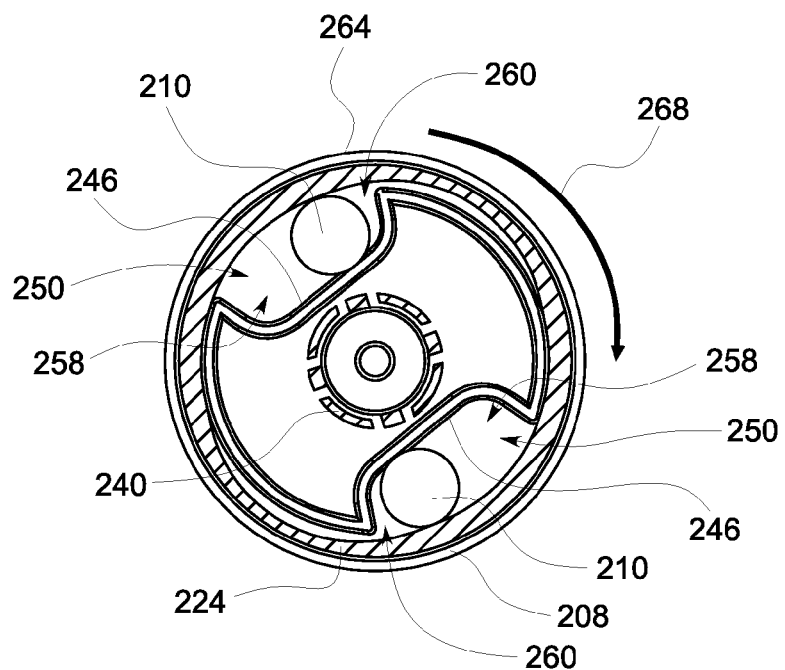

FIG. 10 is a top cross-sectional view of rotor assembly 200 taken at line B-B in FIG. 7 in a first position when rotor assembly 200 rotates in a first direction 266. FIG. 11 is a top cross-sectional view of rotor assembly 200 taken at line 7 in FIG. 7 in a second position when rotor assembly 200 rotates in a second direction 268. First direction 266 can be clockwise or counter-clockwise, although first direction 266 is shown as being clockwise in FIG. 10. Similarly, second direction 268 can be clockwise or counter-clockwise, although second direction 268 is shown as being counter-clockwise in FIG. 11. First direction 148 (shown in FIG. 5) and first direction 266 need not be the same direction, and second direction 150 (shown in FIG. 6) and second direction 268 need not be the same direction.

Referring to FIG. 10, when rotor assembly 200 rotates in first direction 266, cam ring 224 moves cam follower 210 toward first end region 258 of camming surface 246. Because camming surface 246 is deeper at first end region 258, cam follower 210 is in spaced relation with cam ring 224 and/or camming surface 246 when impeller 202 rotates in first direction 266. Such a state is also referred to as a free state. In the free state, any force between cam follower 210 and cam ring 224 and/or between cam follower 210 and camming surface 246 is released. Hydraulic drag created by cam ring 224 rotating in first direction 266 maintains cam follower 210 in the free state.

Referring to FIG. 11, when rotor assembly 200 rotates in second direction 268, cam ring 224 moves cam follower 210 toward second end region 260 of camming surface 246. Because camming surface 246 is shallower at second end region 260, cam follower 210 is moved into contact with locking surface 236 of cam ring 224 and camming surface 246 when impeller 202 rotates in second direction 268. Such a state is also referred to as a locked state. In the locked state, forces between cam follower 210 and locking surface 236 and between cam follower 210 and camming surface 246 are applied. When the forces are applied to cam follower 210, rotation of impeller 202 is effectively stopped. Follower reliefs 234 along cam ring 224 substantially prevent cam followers 210 from becoming wedged against cam ring 224 while impeller 202 is in a null position. While impeller 202 is stopped, the electrical power supplied to stator winding 58 (shown in FIG. 1) alternates, which alternates the poles of the magnetic field generated by stator winding 58. When the magnetic field reverses direction, stopped impeller 202 will begin rotating in first direction 266 and moves cam follower 210 to the free state.

Figure 12:
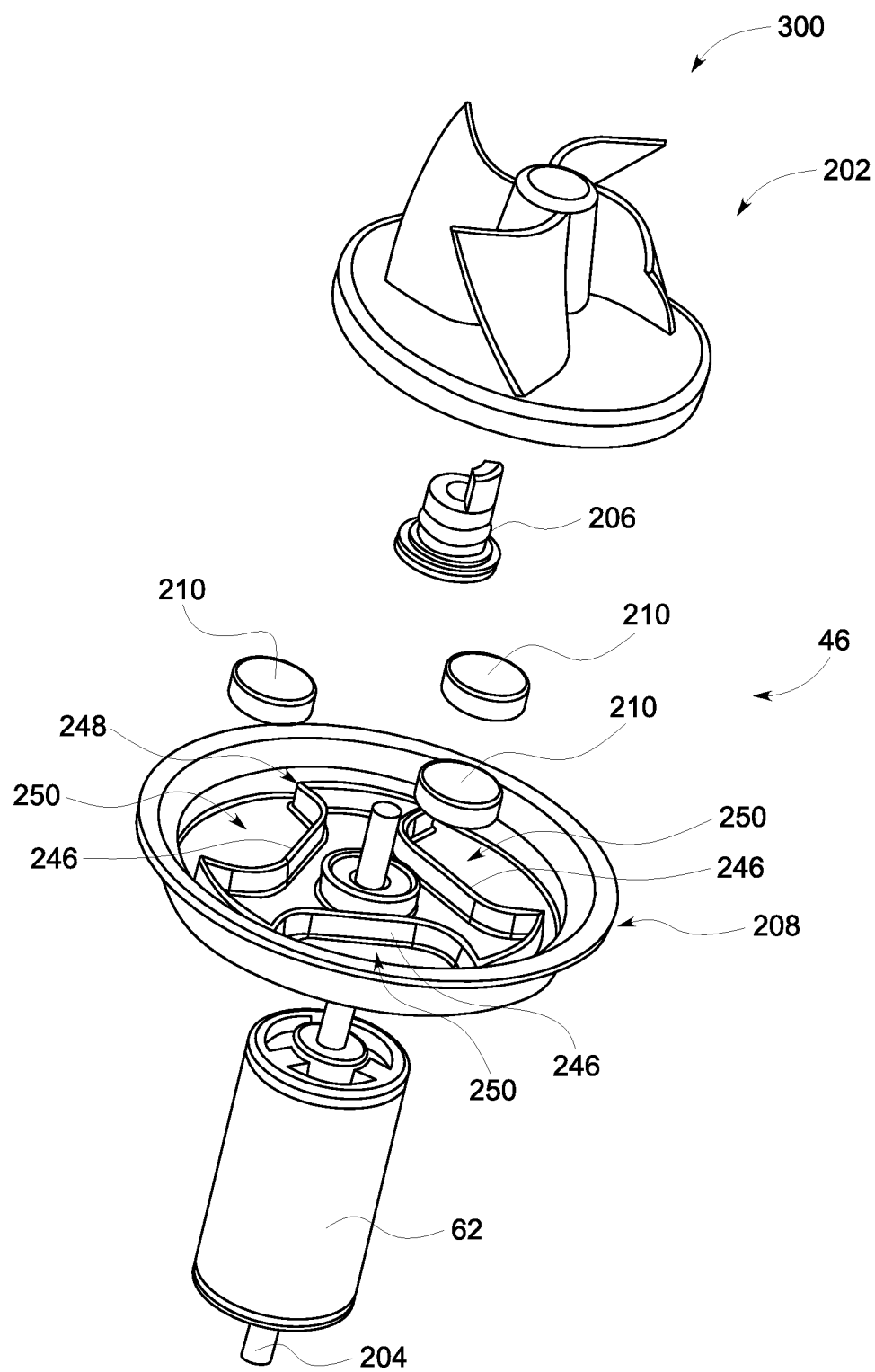
Figure 13:
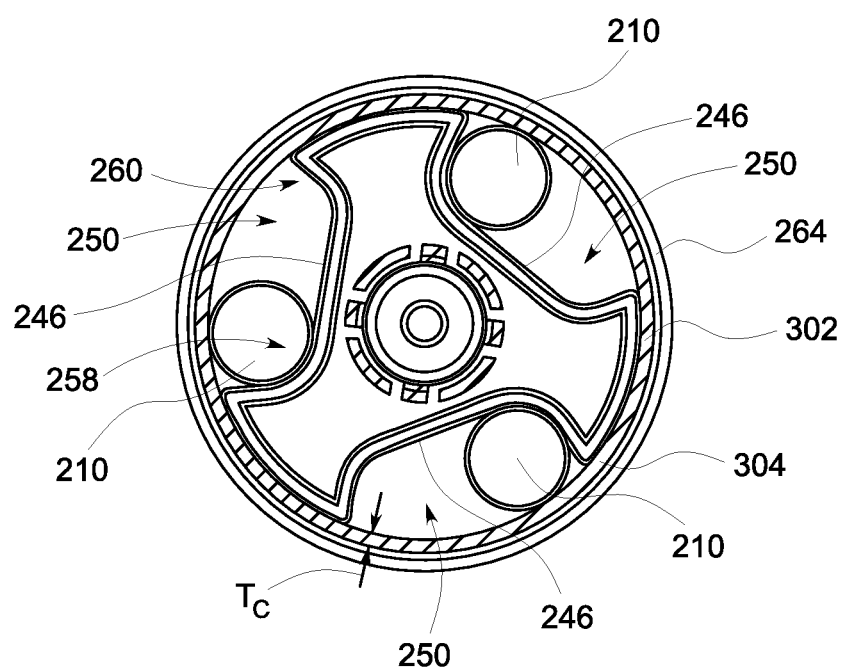

FIG. 12 is an exploded top perspective view of second alternative rotor assembly 300 that may be used with pump 50 (shown in FIG. 1) as rotor assembly 54 (shown in FIG. 1). FIG. 13 is a cross-sectional top view of rotor assembly 300. Rotor assembly 300 is substantially similar to rotor assembly 200 (shown in FIGS. 7-11), except rotor assembly 300 includes three camming surfaces 246, rather than including two camming surfaces 246. As such, components shown in FIGS. 12 and 13 are labeled with the same reference numbers used in FIGS. 7-11.

In the exemplary embodiment, impeller 202 includes a cam ring 302 that is substantially circular. Cam ring 302 is defined by a wall 304 having a substantially constant thickness $T_C$. As such, cam ring 302 does not include follower reliefs 234 (shown in FIG. 9). Alternatively, cam ring 302 includes three follower reliefs 234 and three locking surfaces 236 (shown in FIG. 9) alternately defined by wall 304. In the exemplary embodiment, camming surfaces 246 can be keyed to the poles of stator winding 58 (shown in FIG. 1).

Figure 14:
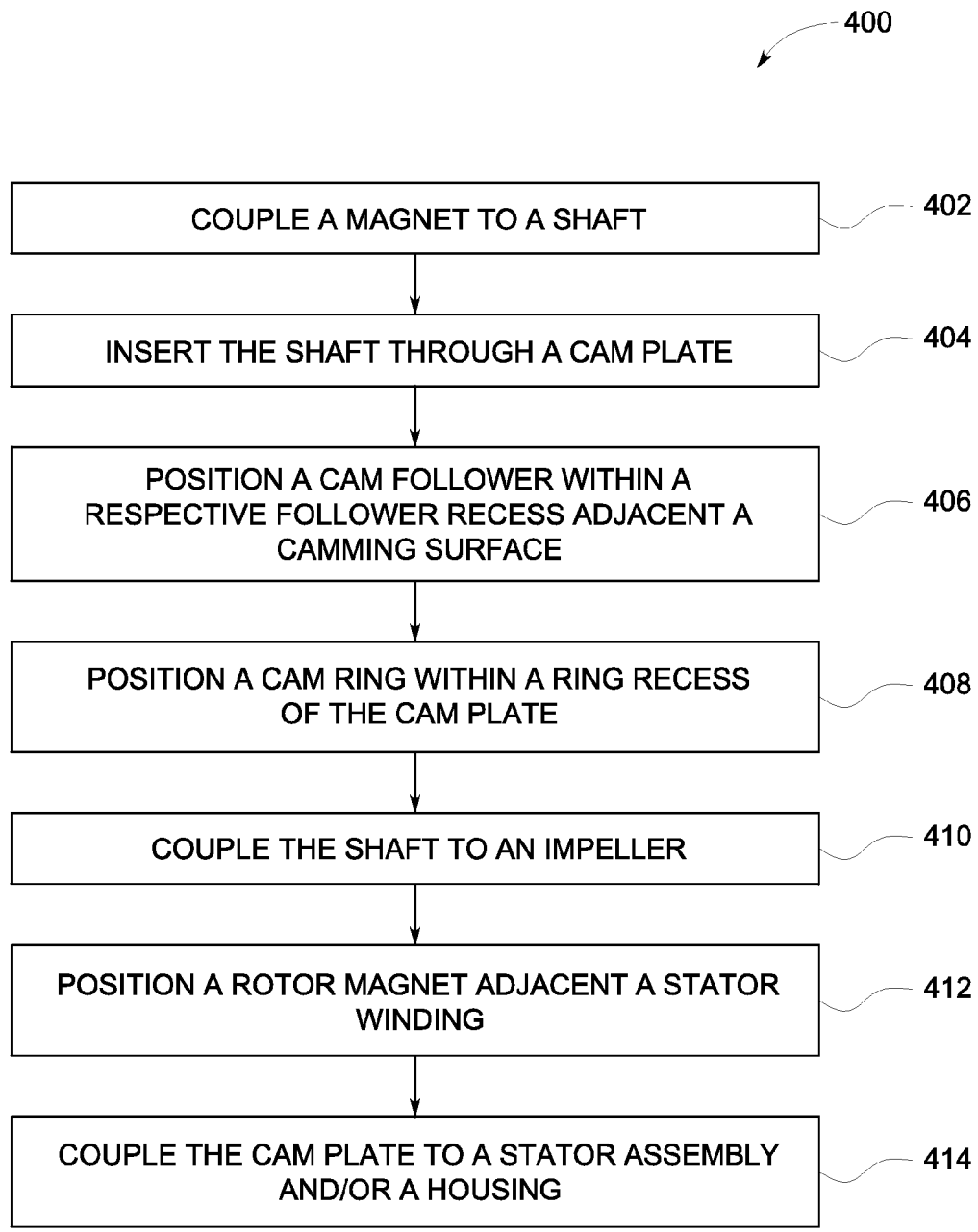

FIG. 14 is a flowchart of an exemplary method 400 for assembling, making, and/or otherwise manufacturing pump 50 shown in FIGS. 1-13. For the sake of clarity, rotor assembly 100 is referred to regarding method 400 unless otherwise noted, however, it should be understood that method 400 is used to assemble, make, and/or other manufacture rotor assembly 200 and/or rotor assembly 300. Further, unless indicated otherwise, the steps of method 400 may be performed in any suitable order. Referring to FIGS. 1-6 and 14, to assemble rotor assembly 100, magnet 62 is coupled 402 to shaft 104, and shaft 104 is inserted 404 through center aperture 138 of cam plate 106. Each cam follower 108 is positioned 406 within a respective follower recess 136 adjacent a camming surface 132. Cam ring 118 is positioned 408 within ring recess 134 of cam plate 106. Shaft 104 is coupled 410, directly or indirectly, to impeller 102. For example, referring to FIGS. 2-6, shaft 104 is coupled 410 directly to impeller 102. Referring to FIGS. 7-13, shaft 204 is coupled 410 indirectly to impeller 202 using driver 206. More specifically, driver 206 is coupled to shaft 204 and inserted into impeller 202 such that driving surfaces 212 and 214 are adjacent driven surfaces 226 and 228, respectively. Referring again to FIGS. 1-6 and 14, rotor magnet 62 is positioned 412 adjacent stator winding 58, and cam plate 106 is coupled 414 to stator assembly 52 and/or housing 56.

The above-described embodiments provide a synchronous pump that includes an impeller biased to rotate in one direction. More specifically, a rotor assembly described herein includes a biasing mechanism that allows the impeller to rotate in a first direction and substantially prevents the impeller from rotating in a second direction opposite the first direction. As such, the impeller described herein includes contoured or curved blades that are more efficient when the rotor assembly rotates in the first direction as compared to when the rotor assembly rotates in the second direction. Accordingly, the pump described above has an optimized hydraulic efficiency as compared to known synchronous pumps, while being more cost effective than known induction pumps. Because the above-described pump is more efficient than known synchronous pumps, the pump described herein can not only be used as a drain pump, but can also be used as a main circulation pump. Moreover, the above-described biasing mechanism is configured to provide null position relief. As such, the pump described herein is more reliable than known synchronous pumps that do not compensate for null positions.

Exemplary embodiments of a rotor assembly including a biasing mechanism are described above in detail. The methods and assemblies are not limited to the specific embodiments described herein, but rather, components of assemblies and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A stationary cam plate for use with a pump, said cam plate comprising:
   at least one stationary camming surface configured to enable an impeller to rotate in a first direction and substantially prevent the impeller from rotating in a second direction opposite the first direction;
   a ring recess defined in said stationary cam plate, said ring recess configured to receive at least a portion of a cam ring coupled to the impeller and configured to rotate within said ring recess; and
   a follower recess in the stationary cam plate, at least partially defined by said at least one stationary camming surface and extending from said ring recess, said follower recess configured to receive at least one cam follower therein, the follower recess having dimensions that force the cam follower in contact with the stationary camming surface and the cam ring to prevent the impeller from rotating in the second direction.

2. A cam plate in accordance with claim 1, wherein said at least one camming surface comprises three camming surfaces each configured to have a respective cam follower positioned adjacent thereto, said ring recess configured to receive the cam ring having a wall with a substantially constant thickness.

3. A cam plate in accordance with claim 1, wherein said at least one camming surface comprises two camming surfaces each configured to have a respective cam follower positioned adjacent thereto, said ring recess configured to receive the cam ring having a wall defining two locking surfaces and two follower reliefs.

4. A cam plate in accordance with claim 1 further configured to be coupled to a stator, the cam ring and the at least one cam follower moveable with respect to said cam plate.

5. A cam plate in accordance with claim 1 further comprising a center aperture configured to receive a shaft therethrough, the shaft configured to rotate with respect to said cam plate.

6. A cam plate in accordance with claim 1, wherein said at least one camming surface comprises a first end region having a first depth and a second end region having a second depth, wherein the second depth is less than the first depth.

7. A cam plate in accordance with claim 1, wherein said ring recess is defined about a center of said cam plate, said follower recess extending radially outward from said ring recess.

8. A cam plate in accordance with claim 1, wherein said ring recess is defined about an outer portion of said cam plate, said follower recess extending radially inward from said ring recess.

9. A cam plate in accordance with claim 1, wherein said cam plate is coupled to a stator having a stator winding, said at least one camming surface fixedly aligned with respect to at least one null position of the stator winding.

10. A cam plate in accordance with claim 1, wherein said at least one camming surface comprises a plurality of camming surfaces circumferentially aligned about said cam plate.

11. An appliance, comprising:
a pump comprising an impeller and a stationary cam plate, said cam plate comprising:
at least one stationary camming surface configured to enable said impeller to rotate in a first direction and substantially prevent said impeller from rotating in a second direction opposite the first direction;
a ring recess defined in said stationary cam plate, said ring recess configured to receive at least a portion of a cam ring coupled to the impeller and configured to rotate within said ring recess; and
a follower recess in the stationary cam plate, at least partially defined by said at least one stationary camming surface and extending from said ring recess, said follower recess configured to receive at least one cam follower therein, the follower recess having dimensions that force the cam follower in contact with the stationary camming surface and the cam ring to prevent the impeller from rotating in the second direction.

12. An appliance in accordance with claim 11, wherein said at least one camming surface comprises a first end region having a first depth and a second end region having a second depth, wherein the second depth is less than the first depth.

13. An appliance in accordance with claim 11, wherein said ring recess is defined about a center of said cam plate, said follower recess extending radially outward from said ring recess.

14. An appliance in accordance with claim 11, wherein said ring recess is defined about an outer portion of said cam plate, said follower recess extending radially inward from said ring recess.

15. An appliance in accordance with claim 11, wherein said pump further comprises a shaft, said cam plate further comprising a center aperture configured to receive said shaft therethrough, said shaft configured to rotate with respect to said cam plate.

16. An appliance in accordance with claim 11, wherein said pump further comprises a stator comprising a stator winding, said cam plate coupled to said stator such that said at least one camming surface is fixedly aligned with respect to at least one null position of said stator winding.

17. An appliance in accordance with claim 11, wherein said at least one camming surface comprises three camming surfaces each configured to have a respective cam follower positioned adjacent thereto, said ring recess configured to receive the cam ring having a wall with a substantially constant thickness.

18. An appliance in accordance with claim 11, wherein said at least one camming surface comprises two camming surfaces each configured to have a respective cam follower positioned adjacent thereto, said ring recess configured to receive the cam ring having a wall defining two locking surfaces and two follower reliefs.

* * * * *